US008239767B2

(12) United States Patent
Smith et al.

(10) Patent No.: US 8,239,767 B2
(45) Date of Patent: Aug. 7, 2012

(54) AUDIO STREAM MANAGEMENT FOR TELEVISION CONTENT

(75) Inventors: Michael Victor Smith, Fremont, CA (US); Jeff Du, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 11/821,745

(22) Filed: Jun. 25, 2007

(65) Prior Publication Data

US 2008/0320525 A1 Dec. 25, 2008

(51) Int. Cl.
G06F 3/16 (2006.01)
H04N 7/00 (2011.01)
H04N 5/445 (2011.01)
H04N 7/173 (2011.01)
G06F 3/00 (2006.01)

(52) U.S. Cl. ........ 715/727; 348/481; 348/483; 348/485; 725/38; 725/61; 725/86

(58) Field of Classification Search .................. 715/727; 348/480, 481, 482, 483, 484, 485, 738; 725/38, 725/61, 86
See application file for complete search history.

(56) References Cited

U.S. PATENT DOCUMENTS

| | | | |
|---|---|---|---|
| 5,497,241 A | 3/1996 | Ostrover et al. | |
| 5,982,448 A | 11/1999 | Reyes | |
| 6,345,147 B1 | 2/2002 | Mimura et al. | |
| 6,637,032 B1 * | 10/2003 | Feinleib | 725/110 |
| 6,661,466 B1 | 12/2003 | Kou | |
| 6,879,349 B2 | 4/2005 | Nishida et al. | |
| 6,940,563 B2 | 9/2005 | Ishihara | |
| 7,051,360 B1 | 5/2006 | Ellis et al. | |
| 7,054,804 B2 | 5/2006 | Gonzales et al. | |
| 7,057,669 B2 | 6/2006 | Lee | |
| 7,545,441 B2 * | 6/2009 | Okamoto | 348/569 |
| 2002/0174430 A1 * | 11/2002 | Ellis et al. | 725/46 |
| 2003/0088612 A1 * | 5/2003 | Goldschmidt et al. | 709/202 |
| 2004/0102955 A1 | 5/2004 | Choi et al. | |
| 2004/0143429 A1 | 7/2004 | Lee | |
| 2005/0149973 A1 | 7/2005 | Fang | |
| 2006/0034589 A1 | 2/2006 | Ahn et al. | |
| 2008/0008447 A1 * | 1/2008 | Iwase et al. | 386/95 |

FOREIGN PATENT DOCUMENTS

| | | |
|---|---|---|
| KR | 20050004216 | 1/2005 |
| KR | 20060004425 | 1/2006 |
| KR | 20070063832 | 6/2007 |

OTHER PUBLICATIONS

Michael Adams, Digital Broadcast Technologies, Aug. 21, 2001, ciscopress.com.*
"PCT Search Report and Written Opinion", Application No. PCT/US2008/066643, (Nov. 26, 2008), 10 pages.
Gauvain, et al., "Audio Partitioning and Transcription for Broadcast Data Indexation", Date: Feb. 2000, pp. 1-20, Kluwer Academic Publishers, Netherlands.
Lamel, et al., "Automatic Processing of Broadcast Audio in Multiple Languages", pp. 1-4, Date: 2002.
Piperidis, et al., "Infrastructure for a multilingual subtitle generation system", pp. 1-5, Date: Jun. 2001.

* cited by examiner

Primary Examiner — Hoang-Vu A Nguyen-Ba
(74) Attorney, Agent, or Firm — Wolfe-SBMC (57) ABSTRACT

Audio stream management techniques are described. In an implementation, a unique representation is generated by a client for each of a plurality of audio streams associated with television content received at the client. Each of the unique representations is displayed in a user interface at the client to be selectable by a user to cause output of a respective audio stream with the television content.

20 Claims, 6 Drawing Sheets

AUDIO STREAM MANAGEMENT FOR TELEVISION CONTENT

BACKGROUND

Traditional television content was provided from a single source of audio and video. Therefore, to output this traditional television content a user simply tuned a television to a particular channel to output the video and audio that was made available via that particular channel. Although this technique was convenient, it was inflexible and required users to tune to different channels if different audio was desired. For instance, a user that desired to view the television program in a different language was forced to tune to another channel to output the television program in the different language, which may be difficult to locate and thus inconvenient.

Although techniques were developed to provide for two audio sources with a single television program, these techniques often required manual interaction on the part of the user each time different audio was desired. For example, a user may tune to a particular television program. To output desired audio, the user was forced to manually input a selection of different audio. Further, the user was generally given little if no information regarding the actual content included in the audio sources, and therefore was not able to make an informed decision as to what audio was being provided by respective audio sources and therefore was often forced to listen to the different sources to make a determination.

SUMMARY

Audio stream management techniques are described. In an implementation, a unique representation is generated by a client for each of a plurality of audio streams associated with television content received at the client. Each of the unique representations is displayed in a user interface at the client to be selectable by a user to cause output of a respective audio stream with the television content In another implementation, one or more computer-readable media include executable instructions that are executable to configure data, which describes one or more attributes of a plurality of audio streams associated with television content, to specify a particular one of the audio streams to be used as a default. The configured data is included with the television content to be streamed to a client.

In a further implementation, a client includes one or more modules that are configured to determine which of a plurality of audio streams to output that are associated with television content when an input is received to tune to the television content. The determination is based at least in part on one or more locally-stored preferences. When the determination cannot be made based on the preferences, the determination is based at least in part on data associated with the television content indicating which of the audio streams is to be used as a default.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional television content was provided from a single source of audio and video. Although this technique was convenient, it was inflexible and required users to tune to different channels if different audio was desired. For instance, a user may initially tune to a television program broadcast on a particular channel with English audio. If the user desired to hear the television program in Spanish, the user was forced to locate and then tune to a different channel having the television program in Spanish. Although techniques were developed to provide for two audio sources of audio with a single television program, these techniques often required manual interaction on the part of the user each time different audio was desired, such as to manually tune to a different audio source each time a user tuned to a different channel.

Techniques are described to provide audio stream management. In an implementation, data that describes attributes of audio streams of television content, such as that data included in a program map table, is used to enumerate, rank and order audio streams for output in a user interface. A user may then specify preferences based on this information which may then be used to manage subsequent consumption of television content. For example, audio streams for a plurality of television channels may be automatically selected based on preferences specified by a user. In this way, the user is provided with seamless navigation designed to address the user's audio preferences.

In another implementation, a provider of the television content may configure this data that describes the attributes to specify one of the audio streams as a "default". Continuing with the previous example, when the preferences of the user "cannot be met" as indicated by the data describing the attributes of the audio streams, the default stream specified by the provider may be output. A variety of techniques may be employed to specify a default audio stream, an example of which may be found in relation to the following figures.

In the following discussion, an exemplary environment is first described that is operable to perform techniques to manage audio streams of television content. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

Figure 1:
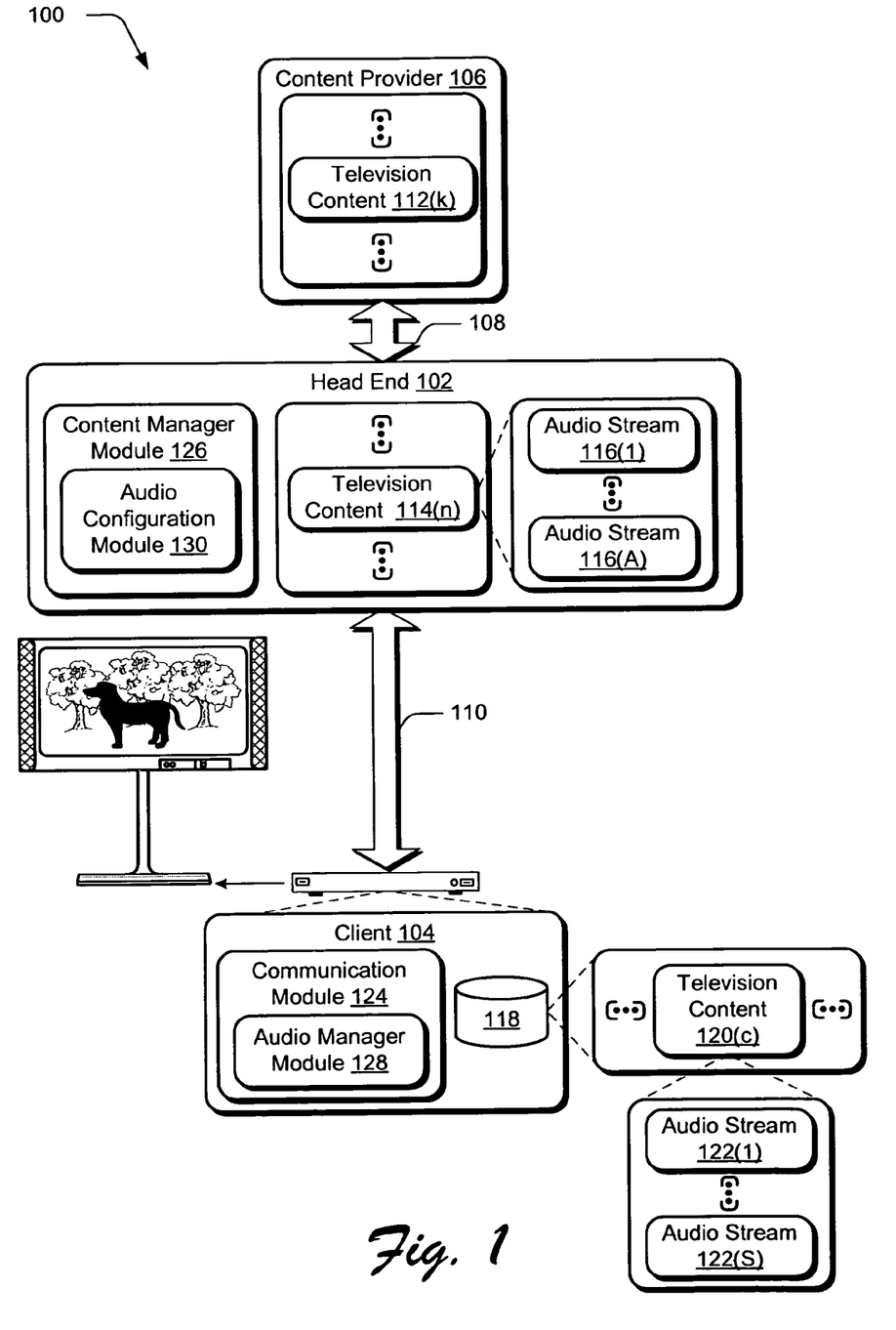
FIG. 1 is an illustration of an environment in an exemplary implementation that is operable to employ techniques to manage audio streams.

FIG. 1 is an illustration of an environment 100 in an exemplary implementation that is operable to manage audio streams. The illustrated environment 100 includes a head end 102 of a network operator, a client 104 and a content provider 106 that are communicatively coupled, one to another, via network connections 108, 110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 110, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine.

The content provider 106 includes one or more items of television content 112($k$), where "k" can be any integer from 1 to "K". The television content 112($k$) may include a variety of data, such as television programming, video-on-demand (VOD) files, and so on. The television content 112($k$) is communicated over the network connection 108 to the head end 102. In the following discussion, television content may also be referred to simply as "content".

Television content 112($k$) communicated via the network connection 108 is received by the head end 102 and may be stored as one or more items of television content 114($n$), where "n" can be any integer from "1" to "N". The television content 114($n$) may be the same as or different from the television content 112($k$) received from the content provider 106. The television content 114($n$), for instance, may include additional data for broadcast to the client 104, such as electronic program guide data, and so on.

The television content 114($n$) is also illustrated as including a plurality of audio streams 116(1)-116(A). The audio streams 116(1)-116(A) may be configured in a variety of ways, such as in compliance with RTP Payload Format RFC-2250, Motion Picture Experts Group 2 (MPEG2) standard, and so on. For example, the plurality of audio streams 116(1)-116(A) may be encapsulated with the television content 114($n$) in a transport stream that is communicated over the network connection 110 to the client 104.

The client 104, as previously stated, may be configured in a variety of ways to receive the television content 114($n$) having the audio streams 116(1)-116(A) over the network connection 110. The client 104 typically includes hardware and software to transport and decrypt content 114($n$) and audio streams 116(1)-116(A) received from the head end 102 for rendering by the illustrated display device and speakers.

The client 104 may also include digital video recorder (DVR) functionality. For instance, the client 104 may include memory 118 to record television content 114($n$) and audio streams 116(1)-116(A) as television content 120($c$) (where "c" can be any integer from one to "C") having audio streams 122(1)-122(S) received via the network connection 110 for output to and rendering by the display device and speakers. The memory 118 may be configured in a variety of ways, such as a hard disk drive, a removable computer-readable medium (e.g., a writable digital video disc), semiconductor based memory, and so on. Thus, television content 120($c$) that is stored in the memory 118 of the client 104 may be copies of the television content 114($n$) that was streamed from the head end 102.

The client 104 includes a communication module 124 that is executable on the client 104 to control content playback on the client 104, such as through the use of one or more "command modes", i.e., "trick modes", to tune to a particular channel, order pay-per-view content, and so on. The command modes may provide non-linear playback of the content 120($c$) (i.e., time shift the playback of the content 120($c$)) such as pause, rewind, fast forward, slow motion playback, and the like.

The head end 102 is illustrated as including a content manager module 126. The content manager module 126 is representative of functionality to configure television content 114($n$) and the audio streams 116(1)-116(A) for output (e.g., streaming) over the network connection 110 to the client 104. The content manager module 126, for instance, may configure content 112($k$) received from the content provider 106 to be suitable for transmission over the network connection 108, such as to "packetize" the television content 114($n$) and the audio streams 116(1)-116(A) into a plurality of streams that are encapsulated within a transport stream for distribution over the Internet, configuration for a particular broadcast channel, map the television content 112($k$) to particular channels, and so on.

Thus, in the environment 100 of FIG. 1, the content provider 106 may broadcast the television content 112($k$) over a network connection 108 to a multiplicity of network operators, an example of which is illustrated as head end 102. The head end 102 may then stream the television content 114($n$) over a network connection 110 to a multitude of clients, an example of which is illustrated as client 104. The client 104 may then store the television content 114($n$) in the memory 118 as television content 120($c$) and/or render the television content 114($n$) immediately for output as it is received, such as when the client 104 is configured to include digital video recorder (DVR) functionality.

The client 104, and more particularly the communication module 124, is illustrated as including an audio manager module 128 which is representative of functionality of the client 104 to manage audio streams 116(1)-116(A), 122(1)-122(S) associated with television content 114($n$), 120($c$), respectively. Although the following discussion will refer to management of audio streams 116(1)-116(A) by the audio manager module 128 of television content 114($n$) received from the head end 102, it should be readily apparent that these techniques are equally applicable to management of other audio streams, such as the audio streams 122(1)-122(S) of the television content 120($c$) stored locally at the client 104.

The audio manager module 128, for instance, may be configured to automatically determine which of the audio streams 116(1)-116(A) to output automatically and without user intervention at the client 104. For example, the content manager module 126 may include an audio configuration module 130 that is representative of functionality to generate data that describes the audio streams 116(1)-116(A) and/or to package the audio streams 116(1)-116(A) with the television content 114(n) for streaming to the client 104. The audio configuration module 130 may set one of the audio streams 116(1)-116(A) as a default. Therefore, when the audio manager module 128 receives the television content 114(n) with the plurality of audio streams 116(1)-116(A), the audio manager module 128 may output the default audio stream unless otherwise directed.

The audio manager module 128 may also be representative of functionality that takes into account user preferences when managing the audio streams 116(1)-116(A). The audio manager module 128, for instance, may output a user interface configured to accept user preferences. The user preferences may then be used when managing audio streams 116(1)-116(A), such as which of the streams meet the preferences input by the user. When the preferences cannot be met, the audio manager module 128 may then output the default audio stream as indicated by the audio configuration module 130 as described in the previous example, further discussion of which may be found in relation to the following figure.

It should be noted that one or more of the entities shown in FIG. 1 may be further divided (e.g., the head end 102 may be implemented by a plurality of servers in a distributed computing system), combined, and so on and thus the environment 100 of FIG. 1 is illustrative of one of a plurality of different environments that may employ the described techniques.

Figure 2:
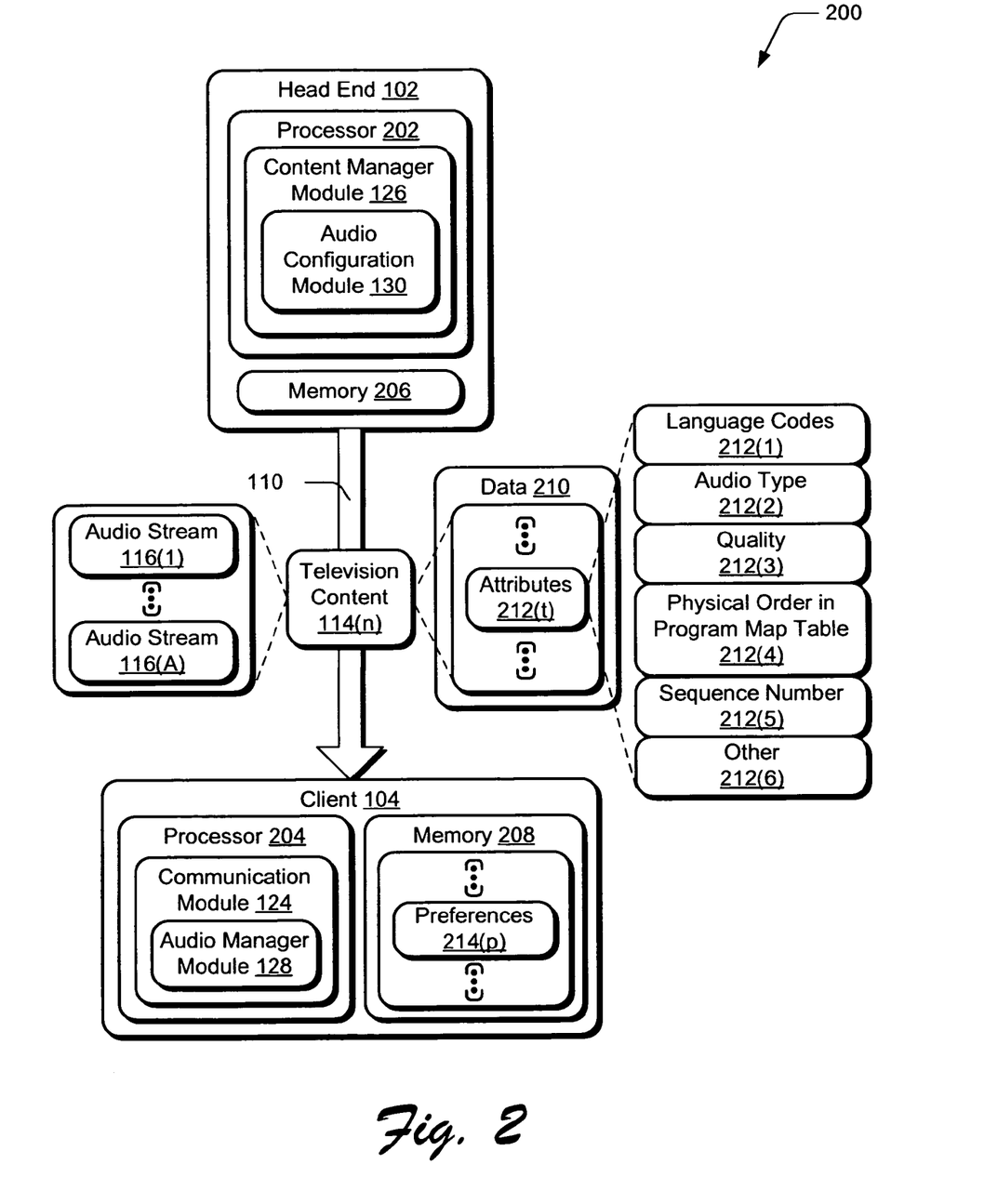
FIG. 2 is an illustration of an exemplary system showing a head end and a client 104 of FIG. 1 in greater detail as streaming television content associated with a plurality of audio streams over a network connection to the client.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices, examples of which are shown in FIG. 2. The features of the techniques to manage audio streams are platform-independent, meaning that the techniques may be implemented on a variety of commercial computing platforms having a variety of processors.

FIG. 2 illustrates an exemplary system 200 showing the head end 102 and the client 104 in greater detail as streaming television content 114(n) associated with a plurality of audio streams 116(1)-116(A) over a network connection 110 to the client 104. The head end 102 and the client 104 are illustrated in FIG. 2 as including respective processors 202, 204 and memory 206, 208, and thus the client 104 of FIG. 2 is illustrated as a client device.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 206, 208 is shown, respectively, for the head end 102 and the client 104, a wide variety of types and combinations of memory may be employed, such as random access memory (RAM), hard disk memory, removable medium memory, and other types of computer-readable media.

The head end 102 is illustrated as executing the content manager module 126 having the audio configuration module 130 on the processor 202, which is also storable in memory 206. As previously described, the audio configuration module 130 is representative of functionality to configure the audio streams 116(1)-116(A) for communication with the television content 114(n) over the network connection 110. In an implementation, the audio configuration module 130 encapsulates each of the audio streams 116(1)-116(A) with the television content 114(n) to be streamed over the network connection 110, although other implementations are also contemplated, such as streaming particular audio streams as requested by the client 104.

In at least one implementation, the audio configuration module 130 is also representative of functionality to generate data 210 that describes one or more attributes 212(t) (where "t" can be any integer from one to "T") of the audio streams 116(1)-116(A). A variety of different attributes 212(t) may be described, such as through use of language codes 212(1) (e.g., English, Spanish, and so on), audio type 212(2) (e.g., format of the audio stream, such as in compliance with MPEG 2), quality 212(3) (e.g., standard or high definition audio), physical order in a program map table 212(4), a sequence number 212(5) as well as "other" 212(6) attributes such as a textual description. These attributes 212(t) described by the data 210 may be configured to provide a wide variety of functionality.

A convention, for instance, may be adopted where each audio stream 116(1)-116(A) is assigned a respective program identifier (PID). The PIDs may then be used to indicate a particular one of the audio streams 116(1)-116(A) is to be used as a "default", e.g., by using an audio stream having a "lowest" PID relative to other PIDs assigned to other audio streams, a "highest" PID, and so on. The PIDs may also be used to indicate a hierarchy of suggested audio stream consumption (e.g., from high to low) through sequential ordering of the PIDs. Therefore, the audio manager module 128 may take the "suggestions" of the head end 102 indicated through use of the PIDs to select a particular one of the audio streams 116(1)-116(A) to be output. Further discussion of configuration of data 210 that describe attributes 212(t) may be found in relation to FIG. 4.

In at least one implementation, the data 210 and the attributes 212(t) may be used by the audio manager module 128 as a basis to define one or more preferences 214(p) (where "p" can be any integer from one to "P") of a user to manage the audio streams 116(1)-116(A). The audio manager module 128, for instance, may output a user interface that includes the data 210 such that a user may specify desired attributes in audio streams 116(1)-116(A) to be output at the client 104, such as particular language, quality, and so on.

These preferences may then be used by the audio manager module 128 to select an audio stream 116(1)-116(A) to be output with the television content 114(n) automatically and without user intervention. For instance, the preferences 214(p) may be applied to a plurality of television channels thus enabling the user to navigate through the channels without manually selecting different audio streams. A variety of other examples are also contemplated, further discussion of which may be found in relation to the following exemplary user interface.

Exemplary User Interfaces

The following discussion describes exemplary user interfaces that may be output by the previously described exemplary environment 100 and system 200, as well as using other environments or systems. Thus, although portions of the following discussion refer to the environment 100 of FIG. 1 and the system 200 of FIG. 2, the following discussion should not necessarily be limited to that environment 100 or system 200.

Figure 3:
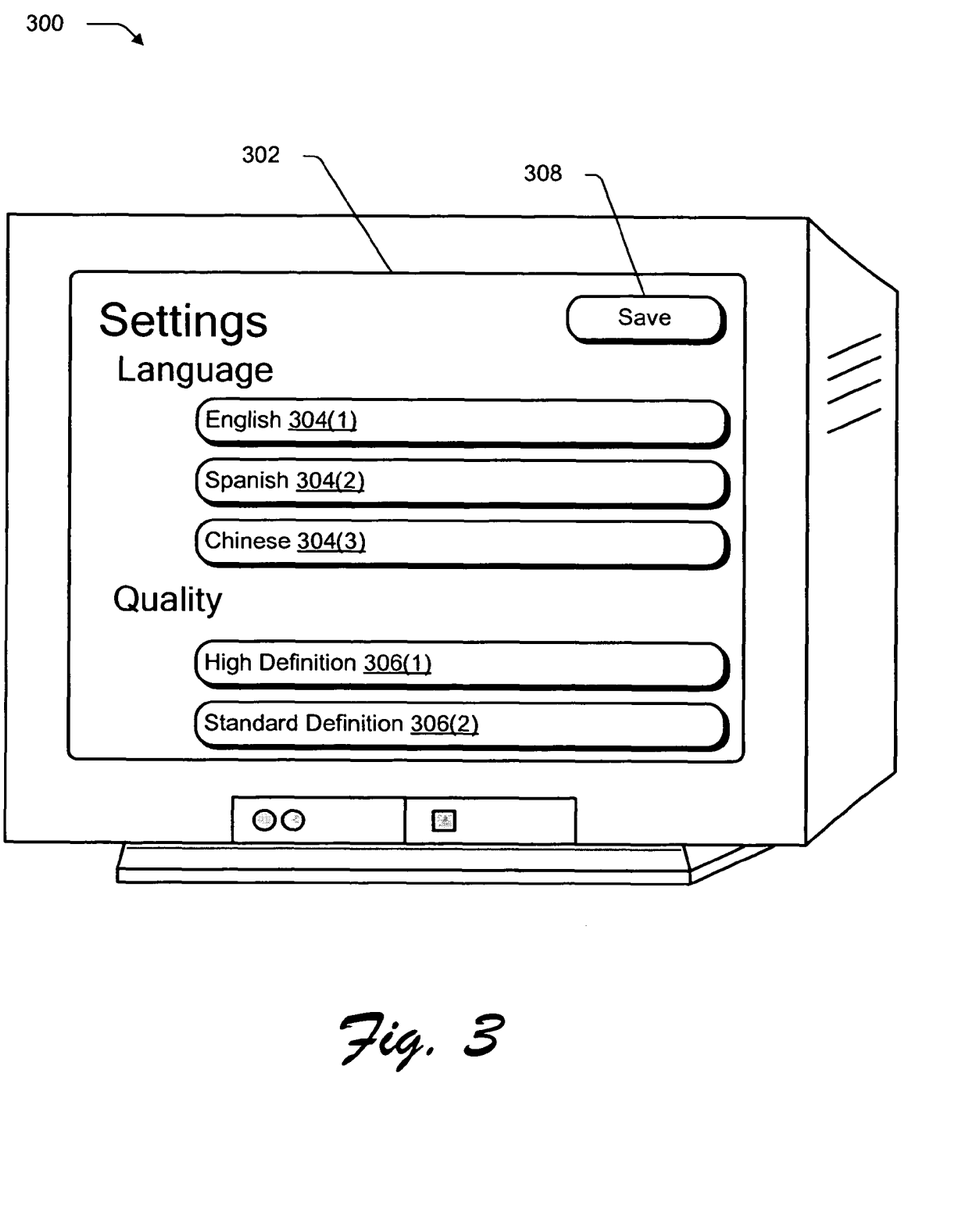
FIG. 3 is an illustration of an exemplary implementation of a user interface that outputs data that describes attributes of audio streams associated with television content.

FIG. 3 depicts an exemplary implementation 300 of a user interface 302 that outputs data that describes attributes 212(t) of audio streams 116(1)-116(A) associated with television content 114(n). The user interface 302 includes a plurality of portions 304(1)-304(6) which incorporate the data 210 that describes the attributes 212(t) of the respective audio streams 116(1)-116(A).

A user, for instance, may select portions 304(1)-304(3) for a language selection, which are illustrated as "English", "Spanish" and "Chinese". A user may also select a level of quality based on another set of portions 306(1)-306(2), which are illustrated as "high definition" and "low definition". A variety of other attributes may be exposed by a network operator, and thus the network operator may influence choices based on the attributes that are exposed to the client 104. A user may then select a "save" portion 308 to have these preferences stored by the client 104. A variety of other techniques are also contemplated.

Figure 4:
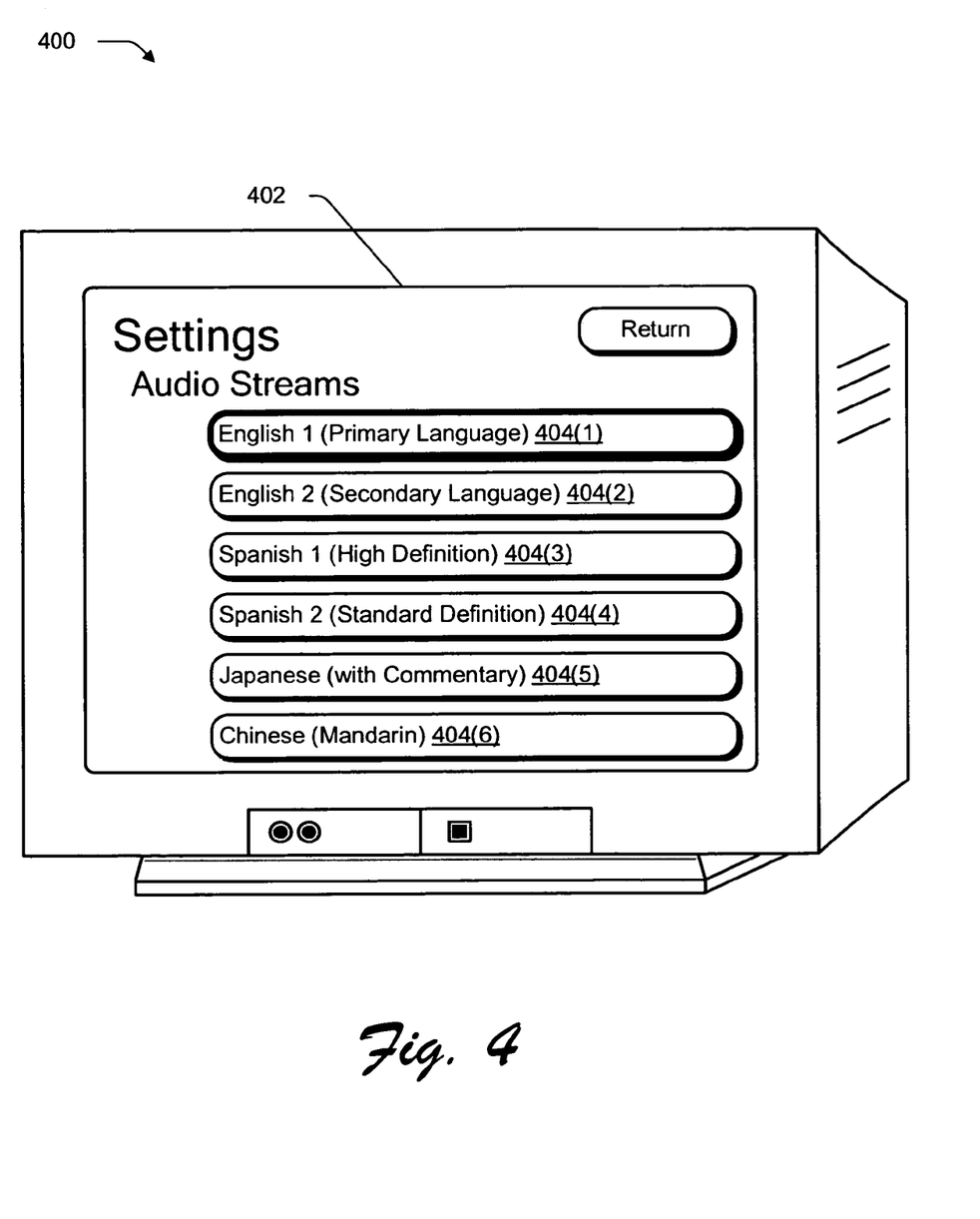
FIG. 4 is an illustration of an exemplary implementation of a user interface that outputs portions that are selectable by a user to choose from one of a plurality of audio streams to be output.

Referring now to FIG. 4, an exemplary implementation 400 of a user interface 402 is shown in which a user may select from a plurality of portions 404(1)-404(6) that represent respective audio streams. This user interface 402 may be output in a variety of different circumstances. For instance, a user may select a preferred one of the audio streams 116(1)-116(A) by selecting data 210 which describes attributes 212(t) of the audio streams 116(1)-116(A). In the illustrated example, a user may select portion 404(3) which includes the data "Spanish 1 (High Definition)" which corresponds to a particular audio stream. The displayed attributes may then be stored as preferences 214(p) which are used by the audio manager module 128 to select audio streams 116(1)-116(A) for the television content that is associated with the described audio streams in the user interface 402 as well as subsequent television content.

For example, the user may change a channel after making the selection in the user interface 402 and have preferences 214(p) related to that selection stored in memory 208 of the client. The preferences 214(p) may then be used to choose an audio stream for television content on the new channel. A variety of other user interfaces and techniques are also contemplated to specify the preferences 214(p), such as by specifying particular attributes manually by the user as previously described in relation to FIG. 3, based on monitored interaction of the user with various audio streams and/or television content, and so on.

The user interface 402 may also be output to change a selection from one audio stream to another during output. For instance, a default audio stream may be output by the client 104, which is illustrated as the portion 404(1) having focus in the user interface 402. A user may then interact with the user interface 402 to change to another one of the audio streams (e.g., selecting portion 404(2) using a remote control) and have that selection stored for subsequent navigation, such as when the user navigates to another channel. A variety of other instances are also contemplated, such as to manually select streams without the use of pre-stored user preferences.

Exemplary Procedures

The following discussion describes audio stream management techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system of FIG. 2 and the embodiments 300, 400 of the exemplary user interfaces 302, 402 of FIGS. 3 and 4, respectively.

Figure 5:
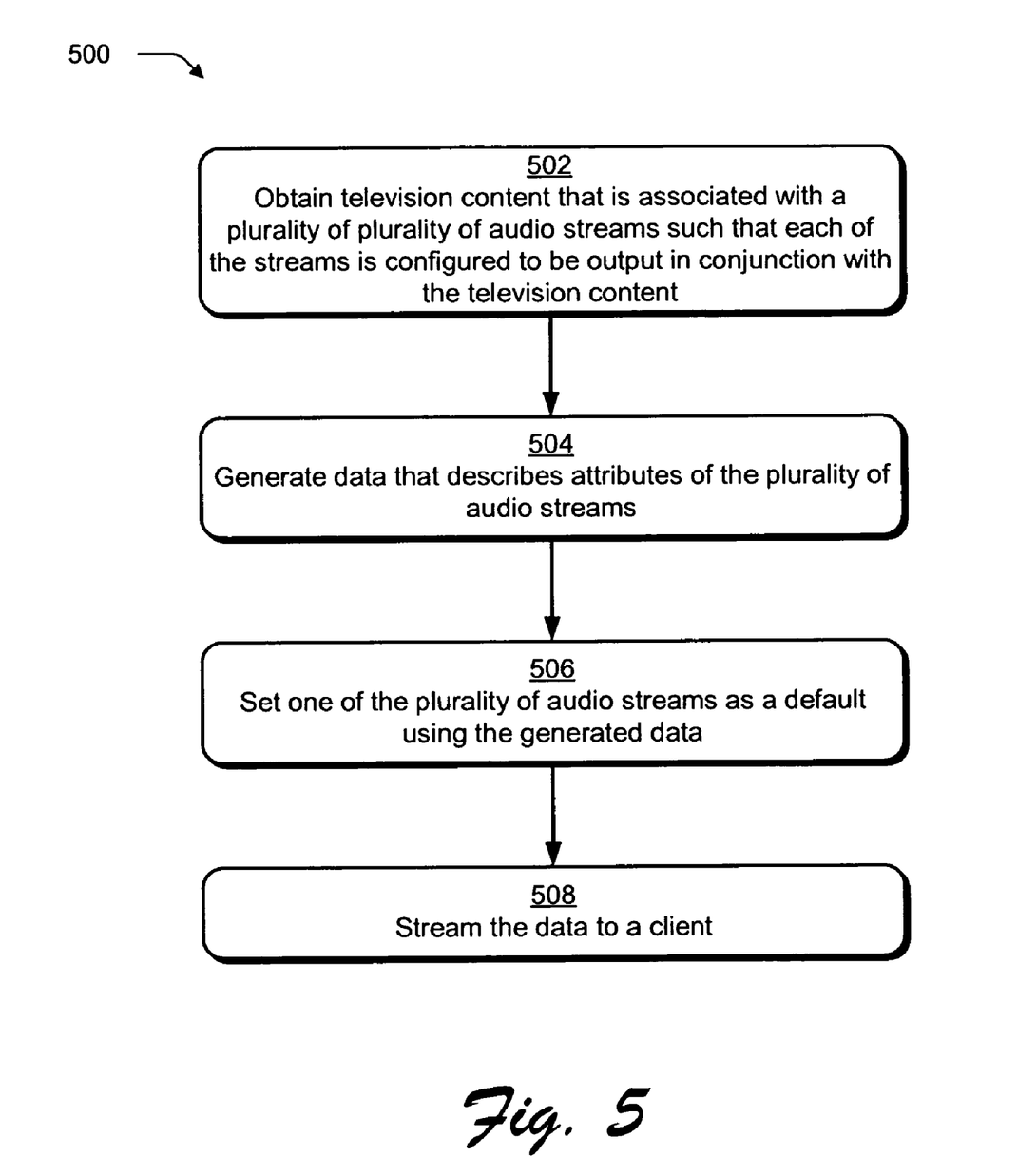
FIG. 5 is a flow diagram depicting a procedure in an exemplary implementation in which data that describes attributes of audio streams associated with television content is configured to indicate a default audio stream.

FIG. 5 depicts a procedure 500 in an exemplary implementation in which data that describes attributes of audio streams associated with television content is configured to indicate a default audio stream. Television content is obtained that is associated with a plurality of audio streams such that each of the streams is configured to be output in conjunction with the television content (block 502). For example, the head end 102 may receive television content 114(n) from the content provider 106 that includes the plurality of audio streams 116(1)-116(A). The audio streams 116(1)-116(A) may be configured in a variety of ways, such as audio for the television content 114(n) in different languages, having different audio types, having different levels of quality, and so on.

Data is generated that describes attributes of the plurality of audio streams (block 504). A technician at the head end 102, for instance, may interact with a user interface output by the audio configuration module 130 to specify attributes 212(t) of the audio streams 116(1)-116(A). The attributes 212(t) may describe the audio streams 116(1)-116(A) in a variety of ways, such as by describing a makeup of the audio streams 116(1)-116(A) themselves (e.g., language code 212(1), audio type 212(2), quality 212(3), textual description), how the audio streams 116(1)-116(A) are provided and/or identified (e.g., a PID, physical order in a program map table 212(4), sequence number 212(5)), and so on. In another instance, the data 210 may be generated automatically by the audio configuration module 130 without user intervention. A variety of other instances are also contemplated.

One of the plurality of audio streams are set as a default using the generated data (block 506). As previously described, a convention may be adopted where each audio stream 116(1)-116(A) is assigned a respective program identifier (PID). The PIDs may then be used to indicate a particular one of the audio streams 116(1)-116(A) is to be used as a "default", e.g., by using an audio stream having a "lowest" or "highest" PID relative to other PIDs assigned to other audio streams. In this way, the audio configuration module 130 may specify which of the audio streams 116(1)-116(A) is to be used as a default by providing that audio stream with "the lowest PID" or "the highest PID" depending on the convention used. A variety of other examples are also contemplated such as through use of a flag or other identifier in a program map table. The default audio stream may then be output when an audio stream is not available that meets preferences 214(p) specified at the client 104, further discussion of which may be found in relation to FIG. 6.

The data is streamed to a client (block 508). For example, the data 210 may be streamed with the television content and the plurality of audio streams from the head end 102 to the client 104. In another example, the data 210 may be provided separately from the television content 114(n). A variety of other examples are also contemplated.

Figure 6:
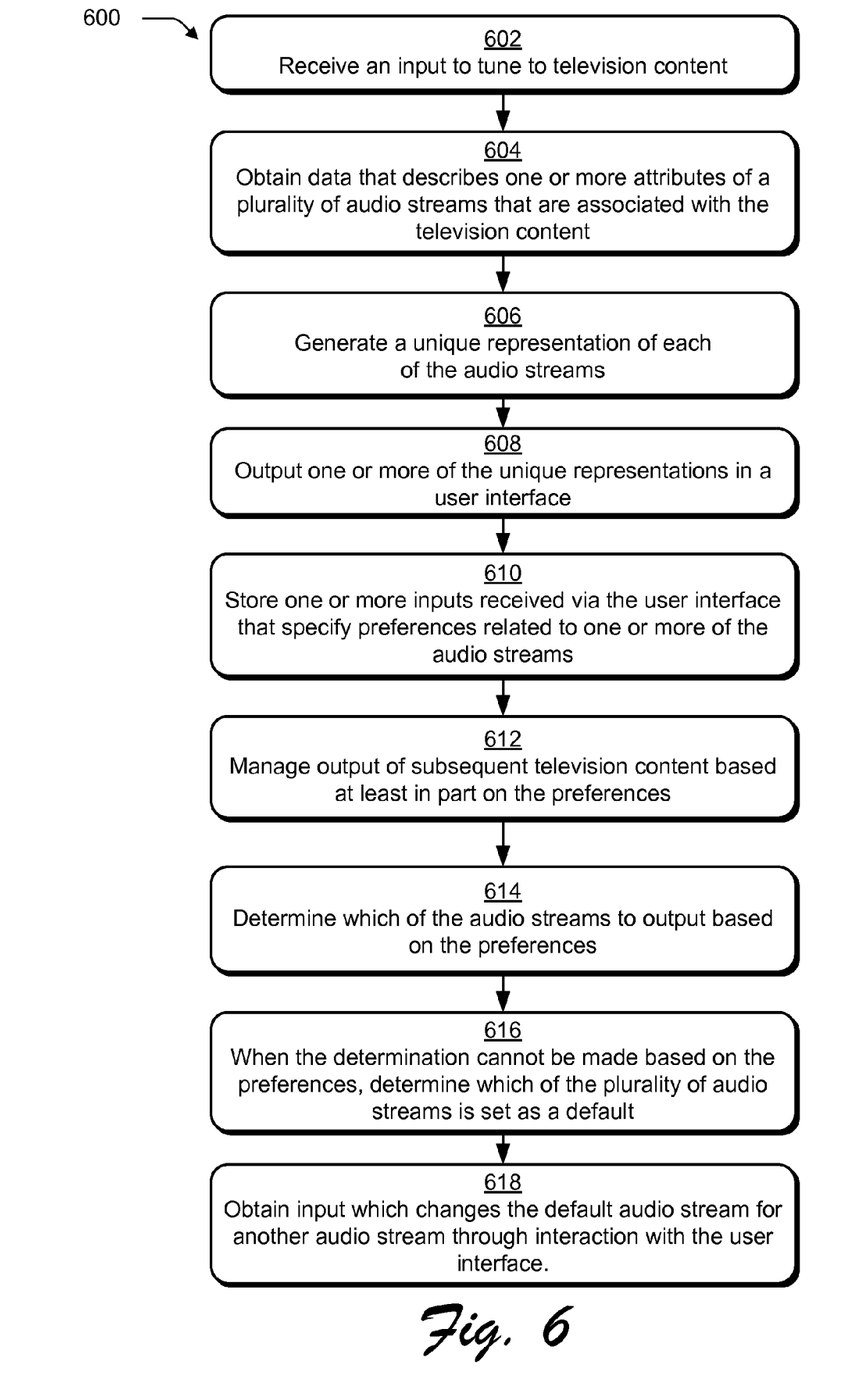
FIG. 6 is a flow diagram depicting a procedure in an exemplary implementation in which a user interface is output to specify user preferences that has unique representations of audio streams that are generated from data that describes the audio streams.

FIG. 6 depicts a procedure 600 in an exemplary implementation in which a user interface is output to specify user preferences which has unique representations of audio streams that are generated from data that describes the audio streams. An input is received to tune to television content (block 602). For example, the client 104 may include a remote control which is configured to provide inputs to tune to a particular channel, such as by using a "channel up" or "channel down" button, entering a channel number, selecting television content from an electronic program guide (EPG), and so on.

Data is obtained that describes one or more attributes of a plurality of audio streams that are associated with the television content (block 604). The audio manager module 128 of the client 104, for instance, may obtain a program map table that includes data 210 describing one or more attributes 212(*t*) as previously described in relation to FIG. 4.

A unique representation is generated of each of the audio streams (block 606). The representation may be generated in a variety of ways. For example, a language code 212(1) may be taken from a program map table and resolved to a corresponding language, such as English, Spanish, and so on. Additionally, an audio type 212(2) may be determined, such as a particular format or standard with which the audio stream complies. Quality 212(3) may also be used, such as whether the audio stream is considered "high definition", "standard definition", and so on. A variety of other examples are also contemplated such as physical order of the audio streams 116(1)-116(A) in a program map table, a sequence number 212(5) which is added when each other attribute matches, and "other" 212(6) attributes 212(*t*), use of a textual description associated with the streams, and so on. In this way, the audio manager module 128 may traverse a naming convention until a unique representation is generated.

One or more of the unique representations is output in a user interface (block 608). For example, the unique representations that incorporate at least a portion of the data 210 that describes attributes 212(*t*) of the audio streams 116(1)-116(A) may be output in a user interface, an example of which is shown in the user interface 402 of FIG. 4. In this way, each of the unique representations may be displayed in the user interface to be selectable to cause output of a respective audio stream with the television content.

In an implementation, the unique representations output in the user interface are prioritized. For example, the unique representations may be grouped based on language, with the most common languages being listed first. Unique representations within these groups may also be prioritized, such as based on quality of the audio (e.g., from relatively higher resolution to lower resolution). A variety of other examples are also contemplated to prioritize how the representations are ordered in a display, one to another.

In a further implementation, the unique representations may be output to preserve "legacy" conventions. For instance, the unique representations may include data 210 describing attributes such that a first one of the unique representation as a "primary" and another one of the unique representations as a "secondary" in accordance with RTP Payload Format RFC-2250. In another instance, a combination of RFC-2250 convention with an MPEG-2 convention may be utilized to describe a variety of audio streams that are available for output in an order greater than "primary" and "secondary", e.g., a listing of three or more streams in a numerical order. A variety of other instances are also contemplated.

One or more inputs are stored that are received via the user interface that specify preferences for attributes of one or more of the audio streams (block 610). For example, the use may specify attributes when interacting with a user interface such as "Spanish" and "High Definition" as illustrated in the user interface 302 of FIG. 3. In another example, the user may select a particular audio stream having attributes which are then stored as the preferences, such as by selecting portion 404(3) of the user interface 402 of FIG. 4. A variety of other examples are also contemplated.

Output of subsequent television content is managed based at least in part on the preferences (block 612). For example, a determination may be made as to which of the audio streams are to be output based on the preferences (block 614), such as by matching attributes stored as part of the preferences 214(*p*) with attributes 212(*t*) of data 210 that describes the audio streams 116(1)-116(A).

When a determination cannot be made based on the preferences, a determination is made as to which of the plurality of audio streams is set as a default (block 616). Continuing with the example of FIG. 5, for instance, a particular one of the audio streams 116(1)-116(A) may be selected which has a PID that is lower than the PID of other audio streams that are associated with the television content 114(*n*). A variety of other examples are also contemplated, such a through use of a flag, physical order within a program map table, and so on.

An input may then be obtained which changes the default audio stream for another audio stream through interaction with the user interface (block 618). A user, for instance, may interact with the user interface 402 of FIG. 2 and note that the default audio stream is indicated by portion 404(1) through use of a focus applied to that portion 404(1), e.g., the border in the illustrated instance. The user may then select from the other portions 404(2)-404(6) to change to a respective audio stream based on the unique representations in the other portions 404(2)-404(6). In this way, the user is readily informed as to other choices that are available and the characteristics of those choices without having to cause output of the other choices. A variety of other instances are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
generating a unique representation, based at least in part using data received with television content, by a client, that describes attributes other than language code for each of a plurality of audio streams associated with television content received at the client; and
displaying each said unique representation in a user interface at the client to be selectable by a user to cause output of a respective said audio stream with the television content.

2. A method as described in claim 1, wherein the generating is performed in response to receipt of an input to cause the client to tune to the television content.

3. A method as described in claim 1, wherein the generating is based at least in part using data received with the television content that describes attributes of the plurality of audio streams.

4. A method as described in claim 3, wherein the data is taken from a program map table associated with the television content.

5. A method as described in claim 3, wherein the data is selected from a group consisting of:
a language code;
an audio type;
quality;
a textual description;
physical order of references to the plurality of audio streams in a program map table; and
a sequence number.

6. A method as described in claim 1, wherein the user interface is configured to change from a default said audio stream specified by a network operator to another said audio stream specified by the user.

7. A method as described in claim 1, further comprising managing which of the plurality of audio streams is output for a plurality of television channels using one or more selections made using the user interface.

8. A method as described in claim 7, further comprising prioritizing an order of how each said unique representation is displayed, on to another, in the user interface.

9. A method as described in claim 8, wherein the prioritizing is performed such that a first said unique representation identifies a first said audio stream as a primary and a second said unique representation identifies a second said audio stream as secondary.

10. One or more computer-readable storage media comprising executable instructions that are executable to:
configure data, which describes one or more attributes other than language code of a plurality of audio streams associated with television content, to specify a particular one of the audio streams to be used as a default; and
include the configured data with the television content to be streamed to a client.

11. One or more computer-readable storage media as described in claim 10, wherein the configuration of the data is performed by specifying particular program identifiers to one or more of the plurality of audio streams.

12. One or more computer-readable storage media as described in claim 11, wherein the audio stream which has a lowest said program identifier, in relation to other said program identifiers of other said audio streams that are associated with the television content, is the default.

13. One or more computer-readable storage media as described in claim 10, wherein the executable instructions are further executable to stream the configured data with the television content and the plurality of streams over a network connection to the client.

14. A client comprising one or more modules configured to determine which of a plurality of audio streams to output that are associated with television content when an input is received to tune to the television content, wherein:
the determination is based at least in part on one or more locally-stored preferences, which describe one or more attributes, other than language code, associated with the plurality of audio streams, at least one attribute of the one or more attributes associated with an audio quality; and
when the determination cannot be made based on the preferences, the determination is based at least in part on data, which describes one or more attributes other than language code, associated with the television content indicating which of the audio streams is a default.

15. A client as described in claim 14, wherein the determination is made automatically and without user intervention using the locally-stored preferences previously provided by a user.

16. A client as described in claim 14, wherein:
the determination based on the one or more locally-stored preferences is performed such that when a preferred said audio stream is not available, another said audio stream in a similar language is output; and
when the determination cannot be made based on the one or more locally-stored preferences to find the other said audio stream, the determination is based at least in part on the data associated with the television content indicating which of the audio streams is the default.

17. A client comprising one or more modules that are configured to tune to television content and apply one or more user preferences associated with an audio stream, other than language code, to determine which of a plurality of audio streams associated with television content are to be output, the one or more modules further configured to indicate a hierarchy of suggested audio stream consumption associated with the plurality of audio streams.

18. A client as described in claim 17, wherein the one or more user preferences are applied automatically and without further user intervention to determine which of the plurality of audio streams to output.

19. A client as described in claim 17, wherein the one or more modules are further configured to output a user interface to specify the one or more user preferences.

20. A client as described in claim 17, wherein the determination is based at least in part on data of in a program map table included with the television content.

* * * * *